United States Patent
Muehlenstaedt et al.

(10) Patent No.: US 12,488,564 B2
(45) Date of Patent: Dec. 2, 2025

(54) SYSTEMS AND METHODS FOR IMAGE CLASSIFICATION USING A NEURAL NETWORK COMBINED WITH A CORRELATION STRUCTURE

(71) Applicant: FORD GLOBAL TECHNOLOGIES, LLC, Dearborn, MI (US)

(72) Inventors: Thomas Muehlenstaedt, Bavaria (DE); Jelena Frtunikj, Bavaria (DE)

(73) Assignee: Ford Global Technologies, LLC, Dearborn, MI (US)

( * ) Notice: Subject to any disclaimer, the term of this patent is extended or adjusted under 35 U.S.C. 154(b) by 568 days.

(21) Appl. No.: 17/807,550

(22) Filed: Jun. 17, 2022

(65) Prior Publication Data
US 2023/0410469 A1     Dec. 21, 2023

(51) Int. Cl.
*G06V 10/764*   (2022.01)
*G06V 10/82*    (2022.01)
*G06V 20/56*    (2022.01)

(52) U.S. Cl.
CPC ............ *G06V 10/764* (2022.01); *G06V 10/82* (2022.01); *G06V 20/56* (2022.01)

(58) Field of Classification Search
CPC ...... G06V 10/764; G06V 10/82; G06V 20/56; G06V 10/454; G06V 10/809; G06V 20/58
See application file for complete search history.

(56) References Cited

U.S. PATENT DOCUMENTS

| | | | |
|---|---|---|---|
| 7,912,278 B2 | 3/2011 | Fung et al. | |
| 2018/0136477 A1* | 5/2018 | Moriuchi | G06T 7/571 |
| 2019/0012581 A1* | 1/2019 | Honkala | G06V 10/758 |
| 2020/0394506 A1* | 12/2020 | Louizos | G06N 3/08 |
| 2021/0276564 A1* | 9/2021 | Efrat Sela | G08G 1/167 |
| 2022/0237907 A1* | 7/2022 | Tang | G06V 10/761 |

FOREIGN PATENT DOCUMENTS

CN     112989338 A     6/2021

OTHER PUBLICATIONS

Kan, Shichao, et al. "Local semantic correlation modeling over graph neural networks for deep feature embedding and image retrieval." IEEE Transactions on Image Processing 31 (2022): 2988-3003.https://ieeexplore.ieee.org/abstract/document/9749974 (Year: 2022).*
Jia, Junteng, and Austin R. Benson. "Residual Correlation in Graph Neural Network Regression." arXiv preprint arXiv:2002.08274 (2020).https://arxiv.org/abs/2002.08274 (Year: 2020).*
Jia et al., Residual Correlation in Graph Neural Network Regression, Jun. 16, 2020.

* cited by examiner

Primary Examiner — John Villecco
Assistant Examiner — Han Hoang
(74) Attorney, Agent, or Firm — Frank A. MacKenzie; Brooks Kushman P.C.

(57) ABSTRACT

Systems and methods for performing image classification are disclosed. The methods include, by a processor: receiving an input image, generating a label prediction corresponding to the input image using a trained neural network, generating a correlation structure based on a comparison of the input image with each of a plurality of reference images, and generating an updated label prediction corresponding to the input image using the label prediction and the correlation structure.

19 Claims, 7 Drawing Sheets

SYSTEMS AND METHODS FOR IMAGE CLASSIFICATION USING A NEURAL NETWORK COMBINED WITH A CORRELATION STRUCTURE

BACKGROUND

A neural network is a powerful discriminative modeling tool. Neural networks can be used to solve problems of prediction, classification, structured recognition, and time series analysis, just to name a few. Neural networks are applicable in situations where a relationship between the predictor variables (inputs) and the predicted variables (outputs) exists, even when that relationship is complex and temporally varying. For example, neural networks are used for image classification, natural language processing, object detection, or other similar tasks.

However, such neural networks are susceptible to adversarial attacks using fabricated samples that lead to false predictions (with high confidence), while being perceived as benign by human users. An adversarial attack might entail presenting a neural network with inaccurate or misrepresentative data during training, or it may include introducing maliciously designed data to deceive an already trained neural network. Such adversarial attacks may cause a neural network to malfunction.

Moreover, the prediction accuracy of neural networks is often low with respect to edge cases (scenarios that occur only occasionally, but still need to be dealt with such as the appearance of a unique road sign, or an unexpected animal type on a highway.) and/or corner cases (combinations of normal operation conditions such as driving situations with an iced over road, low sun angle, heavy traffic, and a pedestrian in the roadway). Issues with neural network predictions also may occur with respect to cases that are frequently encountered by still incorrectly classified by the neural network, such as when a traffic light with a specific layout or environment is routinely incorrectly classified.

The above problems are exacerbated due to the general overconfidence of neural network predictions.

This document describes methods and systems that are directed to addressing the problems described above, and/or other issues.

SUMMARY

The present disclosure includes implementing systems and methods for performing image classification. The methods may include receiving an input image, generating a label prediction corresponding to the input image using a trained neural network, generating a correlation structure based on a comparison of the input image with each of a plurality of reference images, and generating an updated label prediction corresponding to the input image using the label prediction and the correlation structure. Optionally, the correlation structure may be a Gaussian process correlation structure. Additionally and/or alternatively, the updated label prediction may be used for controlling navigation of an autonomous vehicle.

In various implementations, generating the correlation structure may include computing a distance between the input image and each of the plurality of reference images, the distance being associated with one or more color channels.

In one or more implementations, generating the updated label prediction corresponding to the input image may include identifying the label prediction as the updated label prediction in response to determining that there exists a correlation between the input image and each of the plurality of reference images that is less than a threshold.

In some other implementations, generating the updated label prediction corresponding to the input image may include identifying a correct label associated with a reference image as the updated label prediction in response to determining that there exists a high correlation between the input image and the reference image.

In some implementations, the methods may also include generating a reference dataset that includes the plurality of reference images. At least one of the plurality of reference images can include an adversarial image or an image associated with an edge case. Optionally, a correct label prediction may be associated with each of the plurality of reference images in the reference dataset.

In some embodiments, generating the correlation structure can include computing a distance between the input image and each of the plurality of reference images by comparing a feature map of the input image and a reference feature map of that reference image. The feature map and the reference feature map may be obtained from a layer of the trained neural network. Generating the correlation structure can also include identifying a reference image of the plurality of reference images that has a highest correlation with the input image, and identifying a correct label associated with the identified reference image as the updated label prediction.

Implementing systems of the above-described methods for image classification and can include, but are not limited to, a processor and a non-transitory computer-readable storage medium comprising programming instructions that are configured to cause the processor to implement a method for image classification. Optionally, the programming instructions may be included in a computer program product.

DETAILED DESCRIPTION

Neural networks are machine learning models that employ one or more model layers to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Prediction tasks show up frequently in autonomous driving, and neural networks are often used for such prediction tasks. For example, autonomous vehicle operation depends on decision-making based on reliable classification using neural networks. However, as discussed above, a neural network is susceptible to malfunction in case of an adversarial attack, when it encounters an edge case or a corner case, and/or when something is routinely misclassified.

For example, in autonomous driving, an adversarial attack may include pixels purposely and intentionally perturbed to confuse and deceive a neural network during image classification and object detection, where such pixels are not easily recognizable by a human user. Moreover, autonomous driving is an example of an environment that presents neural networks with edge cases with a high degree of variability because they are individually unlikely, which makes them hard to catalog. For example, consider a neural network trained to classify road signs. If the network is presented with a new, not previously seen road sign, then the neural network will likely make a confident and probably correct classification. However, if the neural network is presented with an image outside the distribution of images used for training, e.g., an image of a cat, then a conventional neural network is prone to still confidently predict a road sign for the cat image. In another example, a human carrying an object that fits a different object class (such as a bicycle) could be incorrectly classified by an image classification neural network.

While retraining the neural network to recognize adversarial attacks and/or using additional training data including edge cases can help address the above issues to some extent, such retraining is often computationally expensive. This document describes improvements to neural network prediction accuracy (e.g., during image classification) with respect to adversarial input data or edge case input data without intensive retraining of the neural network, thereby reducing computational requirements and/or storage capacity requirements.

The systems and methods of this disclosure utilize a combination of a neural network with a correlation structure (e.g., a correlation structure as used in a Gaussian process) corresponding to a reference dataset that enables significantly improved prediction accuracy during, for example, image classification (as discussed below). In case of image classification, the reference dataset can include images known to be associated with adversarial attacks or edge cases where the reference dataset is not used for training of the neural network but for correction of neural network predictions during inference.

The methods of this disclosure may be used for, for example, object detection in images, improving streaming performance (for evaluating the output of a perception algorithm at all time instants), or the like, for controlling navigation of an autonomous vehicle. It should be noted that while the current disclosure describes neural networks for image classification, it is not so limiting. Rather, the principles of this disclosure can be used for other neural networks prediction tasks such as, without limitation, other computer vision tasks such as object detection (including label prediction for individual objects in an image and their corresponding localization), natural language processing, speech recognition, or the like.

Figure 1:
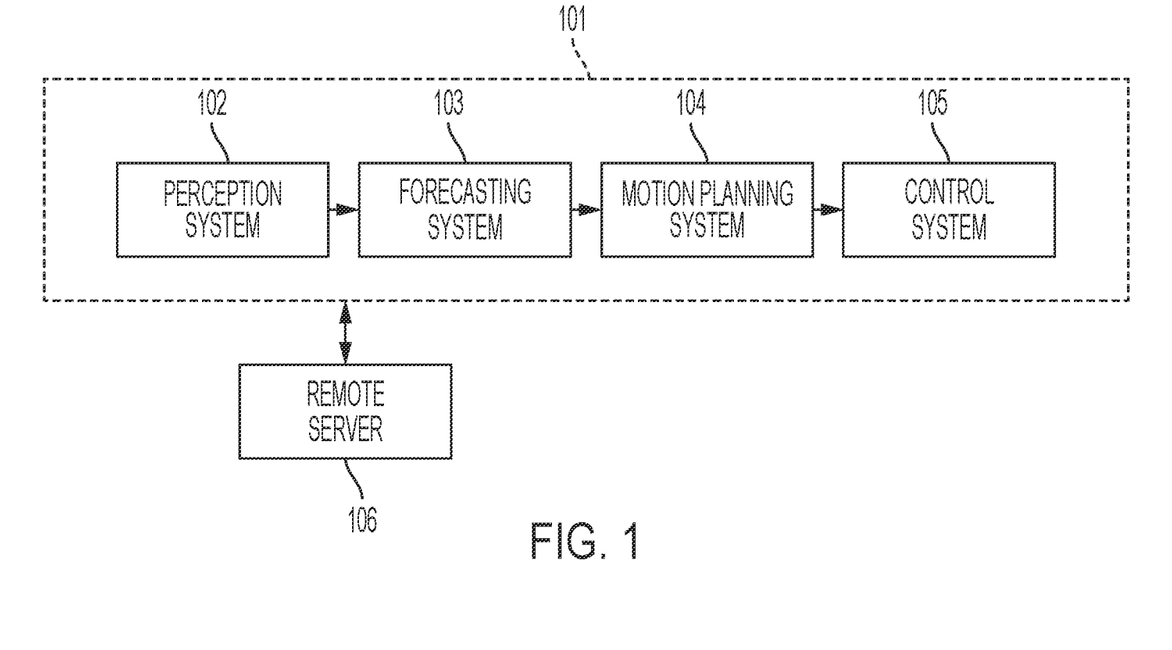
FIG. 1 illustrates an example high-level overview of an autonomous vehicle system.

Before describing the details of the neural network prediction methods, it is useful to provide some background information about autonomous vehicle systems. FIG. 1 shows a high-level overview of autonomous vehicle subsystems that may be relevant to the discussion below.

Specific components within such systems will be described in the discussion of FIGS. 6 and 7 later in this document. Certain components of the subsystems may be embodied in processor hardware and computer-readable programming instructions that are part of the autonomous vehicle's on-board computing system 101.

The subsystems may include a perception system 102 that includes sensors that capture information about moving actors and other objects that exist in the vehicle's immediate surroundings. Example sensors include cameras, LiDAR sensors and radar sensors. The data captured by such sensors (such as digital images, videos including series of image frames, LiDAR point cloud data, or radar data) is known as perception data. The perception system may include one or more processors, and computer-readable memory with programming instructions and/or trained artificial intelligence models that, during a run of the autonomous vehicle, will process the perception data to identify objects and assign categorical labels and unique identifiers to each object detected in a scene. During deployment of the autonomous vehicle, the autonomous vehicle receives perception data from one or more sensors of the autonomous vehicle's perception system. The perception data may include data representative of one or more objects in the environment. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (published in *IEEE Access*, April 2020).

The vehicle's perception system 102 may deliver perception data to the vehicle's forecasting system 103. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 104 and control system 105 so that the receiving systems may assess such data and initiate any number of reactive motions to such data. The motion planning system 104 and control system 105 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

In non-autonomous vehicle embodiments, such as with vehicles that are driven by human operators, the motion planning system 104 may be embodied in processor hardware and computer-readable hardware that are part of an electronic devices that is contained with the vehicle, such as an dashboard navigation system or a mobile electronic device of the operator. In such situations, the electronic device may output the trajectories planned by the motion planning system via a display, an audio speaker, or both. In addition, some parts of the perception system 102 may include a transceiver of an electronic device that receives certain perception data (such as weather data) from a remote server via wireless communication.

The vehicle's on-board computing system 101 will be in communication with a remote server 106. The remote server 106 is an external electronic device that is in communication with the vehicle's on-board computing system 101, either via a wireless connection while the vehicle is making a run, or via a wired or wireless connection while the vehicle is parked at a docking facility or service facility. The remote server 106 may receive data that the vehicle collected during its run, such as perception data and operational data. The remote server 106 also may transfer data or other information to the vehicle such as software updates, high definition (HD) map updates, machine learning model updates and other information.

Figure 2:
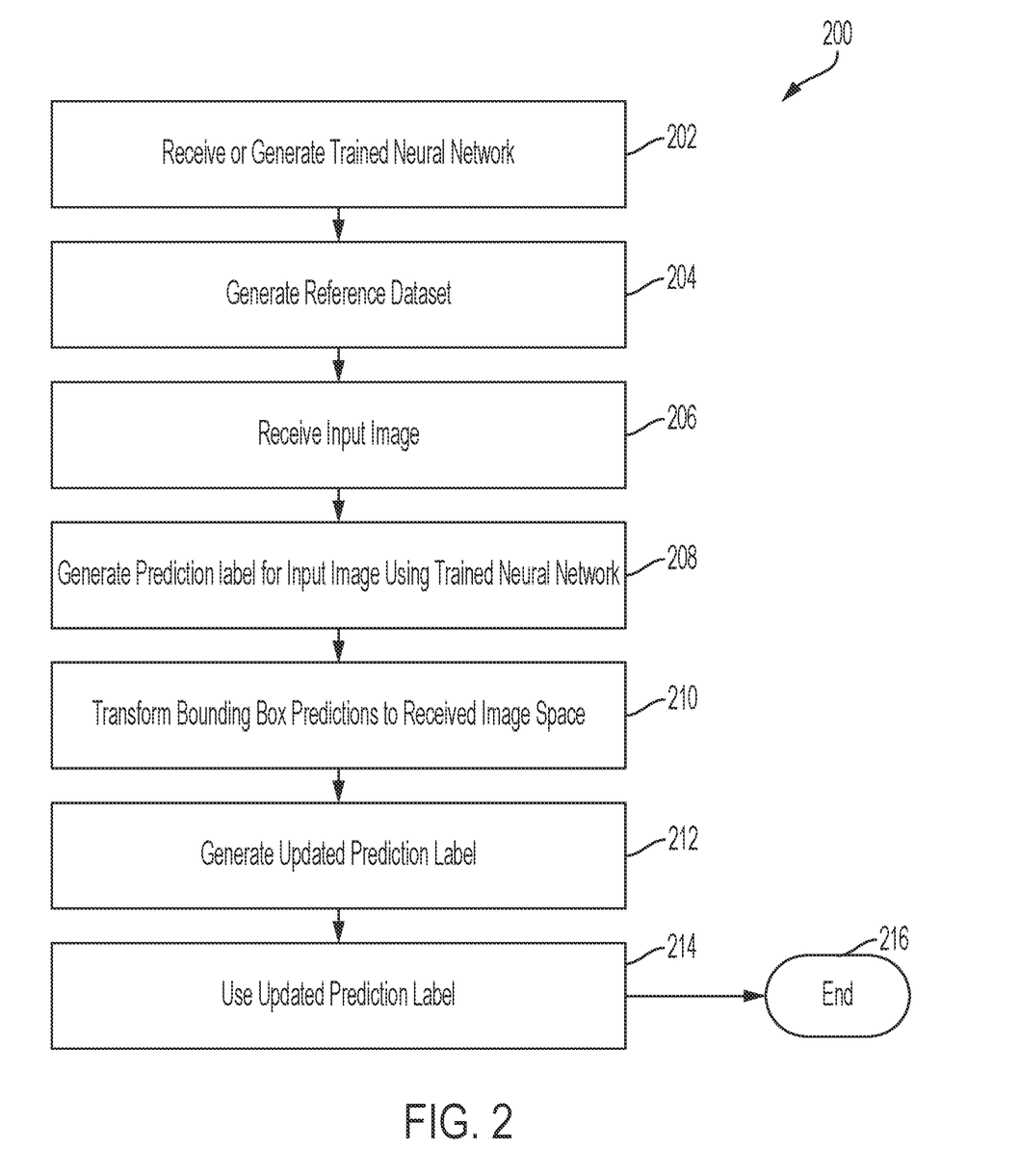
FIG. 2 illustrates an example method for image classification using a combination of a neural network and a correlation structure.

Referring now to FIG. 2, a flowchart illustrating an example method for image classification using a combined neural network and correlation structure is disclosed. As can be appreciated in light of the disclosure, the order of operation within the method is not limited to the sequential execution as illustrated in the figure, but may be performed in one or more varying orders as applicable and in accordance with the present disclosure. In various embodiments, the method can be scheduled to run based on one or more predetermined events, and/or can run continuously during operation of an autonomous vehicle.

At 202, the system may receive or access a neural network (e.g., a convolutional neural network) that has been trained for processing images (e.g., for image classification) and/or train a neural network for performing image classification using training data. The neural network may be associated with a prediction function $nn_\beta(x)$, with "x" being the input image (or any other numerical input) and $\beta$ being the trainable, optimized parameters of the neural network. Since the neural network is trained, it is assumed that the parameters $\beta$ flare already optimized with respect to a loss function.

In a typical neural network, input neurons contain data values, each of which affects the value of a connected neuron according to connections with pre-defined weights, and whether the sum connections to each particular neuron meet a pre-defined threshold. By determining proper connection strengths and threshold values (a process also referred to as "training"), a neural network can achieve efficient recognition of images and characters. Oftentimes, these neurons are grouped into "layers" (e.g., input layers, hidden layers, and output layers) in order to make connections between groups more obvious and to teach computation of values. A neural network may be trained using for example, backpropagation, which feeds training data into the network and then measures the network's performance as a loss function. Backpropagation then utilizes a gradient descent to measure the rate-of-change of the loss function with respect to the weighting of each connection, and the gradient descent step is used to make sure the error rate for each connection is reduced as close to zero as possible.

A convolutional neural network (CNN) is a type of feed-forward artificial neural network in which the connectivity pattern between its neurons is inspired by the organization of the animal visual cortex, whose individual neurons are arranged in such a way that they respond to overlapping regions tiling the visual field. When used for image recognition, image classification, etc., CNNs may include multiple layers of small neuron collections that process portions of the input image, called receptive fields. The outputs of these collections are then tiled so that their input regions overlap, to obtain a better representation of the original image; this is repeated for every such layer.

Figure 3:
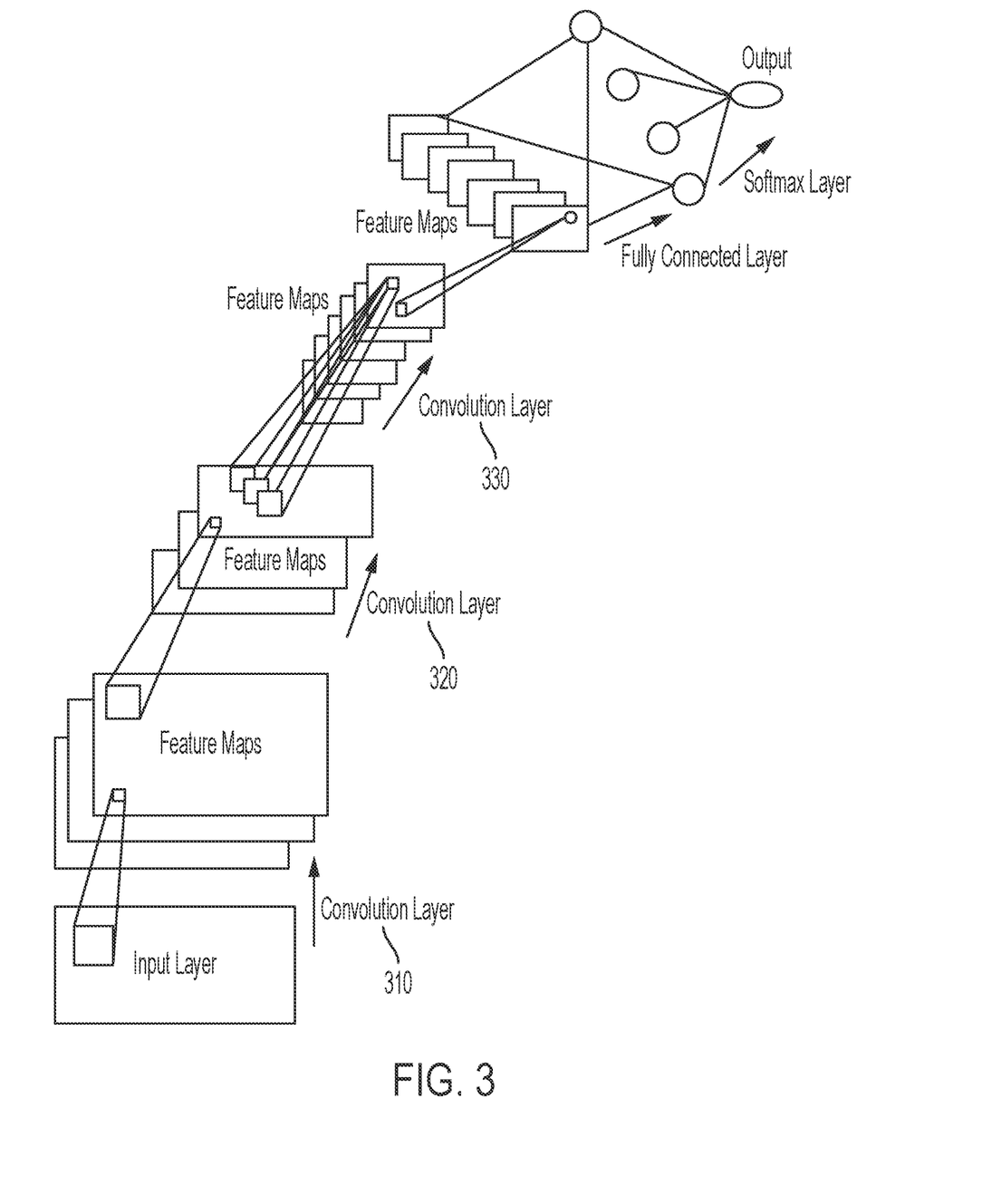
FIG. 3 illustrates an example convolutional neural network.

Referring to FIG. 3, typically, convolutional layers consist of a rectangular grid of neurons. Each convolutional layer requires that the previous layer also be a rectangular grid of neurons. Each neuron takes inputs from a rectangular section of the previous layer; the weights for this rectangular section are the same for each neuron in the convolutional layer. Thus, the convolutional layer is an image convolution of the previous layer, where the weights specify the convolution filter. In addition, there may be several grids in each convolutional layer; each grid takes inputs from all the grids in the previous layer, using potentially different filters.

After each convolutional layer, there may be a pooling layer, which combines the outputs of neuron clusters. The pooling layer takes small rectangular blocks from the convolutional layer and subsamples it to produce a single output from that block. There are several ways to perform pooling, such as taking the average or the maximum, or a learned linear combination of the neurons in the block. One major advantage of convolutional networks is the use of shared weight in the convolutional layers, which means that the same filter (weights bank) is used for each pixel in the layer; this both reduces memory footprint and improves performance.

After several convolutional and pooling layers, the high-level reasoning in the neural network is done via fully connected layers. A fully connected layer takes all neurons in the previous layer (be it fully connected, pooling, or convolutional) and connects it to every single neuron it has. Fully connected layers are not spatially located anymore, so there can be no convolutional layers after a fully connected layer. A final softmax layer may, optionally, be applied to combine the outputs of the fully connected layer using softmax functions.

It should be noted that while this disclosure discussed the use of neural networks and improving neural network prediction accuracy, the disclosure is not so limiting, and the methods disclosed herein may similarly be used for improving the prediction accuracy of other machine learning technologies.

At 204, the system may generate or access a reference dataset that includes reference images $x_1^r, x_2^r \ldots x_n^r$ and associated correct labels $y_1^r, y_2^r \ldots y_n^r$. Each of the reference images are associated with a risk of being wrongly classified, using the neural network, that is higher than a threshold. Such reference images may include edge cases and/or corner cases (e.g., jaywalkers, person coming out of a manhole, person in a Halloween costume, billboard advertisement including a person on a bus/truck, or the like), previously identified adversarial images (e.g., a perturbed image created to deceive a neural network), images that are frequently incorrectly classified (e.g., traffic lights), and/or other images that are considered important (e.g., for passenger comfort in an autonomous vehicle, for object detection, etc.). The reference images may be manually added by a user. Additionally and/or alternatively, the system may automatically add reference images to the reference dataset when, for example, they are wrongly predicted by the neural network with a high confidence (relating to an adversarial attack and/or an edge case). The reference dataset may be continually updated to remove (e.g., when the neural network prediction accuracy with respect to image improves) and/or add reference images manually or automatically.

The system may, optionally, process the reference images using the trained neural network of step 202 to generate feature maps of the reference images at the various neural network layers (e.g., convolution layers 310, 312, and 316 of FIG. 3), and the system may store the feature maps in association with the reference images.

At 206, the system may receive image data describing an input image ($x^p$) from a sensor (e.g., camera), a data store, and/or another component of the system 100. For example, the images can be captured by monocular cameras (e.g., cameras), or the like. In some examples, an image comprises 3 layers (or color channels) of information superimposed on each other—a Red (R) color channel or layer, a Green (G) color channel or layer and a Blue (B) color channel or layer. This image may also be referred to as an RGB image. In other examples, an image may be a gray-scale image, an infrared image, an ultraviolet image, or any other type of image. The images can be stored in a datastore local to and/or remote from the mobile platform (e.g., remote server 106 of FIG. 1).

At 208, the system may process input image ($x^p$) using the trained neural network to generate a label prediction ($y^p$) corresponding to the input image. As used herein, a label prediction (or a "label") is a label for the image that is generated using the neural network of the system.

At 210, the input image ($x^p$) may be compared with each of the reference images in the reference dataset to generate a correlation structure.

For generating the correlation structure, first distances from the input image to the reference images ($\|x^p-x^r\|$) may be calculated using any now or hereafter known methods. For example, the distance may be computed as the Frobenius norm for each channel c (e.g. RGB color channels) resulting in a number of different distances per channel between $x^p$ and the reference images $x_1^r, x_2^r \ldots x_n^r$, such that each channel distance may be represented as $d^{r,p,c}=(\|x^{p,c}-x_i^{r,c}\|)$. Optionally, these channel specific distances (per reference image) may be combined into a single distance by, for example, summing them up, computing an average, or the like. Additionally and/or alternatively, distances from the input image to the reference images may similarly be calculated based on pixel values, intensity values, or other image features.

The system may then use the computed distances to create a correlation structure for the input image. For example, in Gaussian processes, correlation structures which use distances as input may be used. Specifically, when a finite collection of realizations (or observations) have a multivariate normal distribution, each realization individually has a normal distribution and the realizations can be jointly connected by a correlation structure, which may depend on the distance of the input or x-space. As such, if $d^{r,p}$ is the distance between a reference image and an input image, the correlation can be a Gaussian correlation represented by:

$$\text{cor}(d^{r,p})=\exp(-\theta*0.5*(d^{r,p})^2),$$

where the parameter θ is a range parameter that controls how similar the inputs need to be for them to have a high correlation. The parameter θ may either be manually defined and/or estimated automatically using, for example, any now or hereafter known maximum likelihood approaches. The values of the correlation can range from −1 to +1. In some embodiments, negative values of the correlation may be discarded and/or an absolute value may be used. The closer the correlation is to +1 (or −1), the more closely the input and reference images are related. The positive sign signifies the direction of the correlation (i.e. if one of the variables increases, the other variable is also supposed to increase). A correlation structure of an input image is a data structure that includes the correlation values cor($d^{r,p}$) with respect to each of the reference images in the reference dataset. A correlation of the input image is calculated from the correlation structure:

$$\text{cor}_{max}^{(r,p)} := \max_{i=1,\ldots,r} \left(\text{cor}(d^{(i,p)})\right)$$

where, $$r_{max} = \arg\max_{i=1,\ldots,r}\left(\text{cor}(d^{(i,p)})\right)$$

Specifically, in the above equations a reference image from the reference dataset is identified that has the maximum (or highest) correlation with the input image.

While the current disclosure utilizes a Gaussian correlation, other correlation kernels such as, without limitation, cubic correlation kernel, Matérn correlation kernel, or the like are within the scope of this disclosure.

Figure 4:
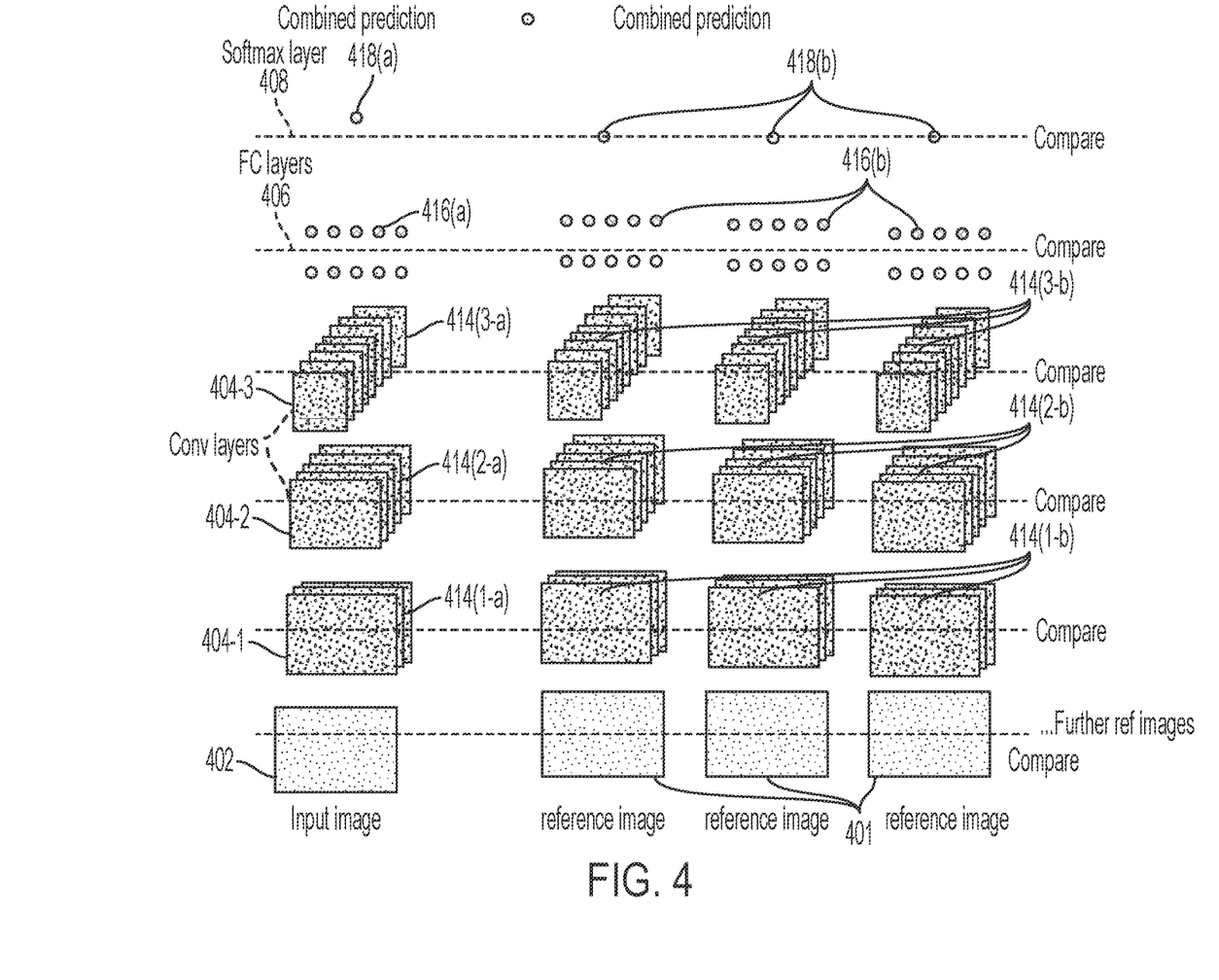
FIG. 4 illustrates an example of image processing layers using a convolutional neural network.

It should be noted that instead of determining the correlation structure by performing the above computations directly on the input image, the computations may be similarly performed on an output of a convolutional layer (the only difference being in the number of color channels). Specifically, a feature map of the input image at a convolutional layer of the trained neural network may be compared to the feature maps of the reference images at the corresponding convolutional layer (the feature maps of reference images discussed above). For example, as shown in FIG. 4, distances may be calculated between feature maps of the input image and the reference images across the same convolution layer, fully connected layer, and/or the softmax layer (as shown by the dashed lines). Specifically, as shown in FIG. 4, the input image 402 is compared with the reference images 401. Similarly, the feature maps of the input image 401 at each convolution layer level (e.g., 404-1, 404-2, and 404-3) are compared to the feature maps corresponding to the reference images 402 at the same convolution layer level. Specifically, feature maps 414(1-$a$) are compared to feature maps 414(1-$b$), feature maps 414(2-$a$) are compared to feature maps 414(2-$b$), and feature maps 414(3-$a$) are compared to feature maps 414(3-$b$). The output of the fully connected layer 406 from the input image (416($a$)) is compared to the outputs of the fully connected layer 406 from the reference images (416($b$)), and the output of the softmax layer 408 from the input image (418($a$)) is compared to the outputs of the softmax layer 408 from the reference images (418($b$)).

At 212, given the correlation of the input image to a reference image and the true label prediction for the reference image, an updated label prediction can be constructed as follows:

$$\widehat{nn}_\beta(x^p); nn_\beta(x^{(p)})*(1-\text{cor}(d^{(r,p)}))+\text{cor}(d^{(r,p)})*y^{(r)}$$

Due to the correlation structure, feeding exactly the reference image into the above prediction function will predict the label prediction of the reference image ($y^{(r)}$). Specifically, if the correlation between the input image and a reference image is determined to be high (i.e., cor($d^{r,p}$)→[1] and/or cor($d^{r,p}$) is greater than a threshold such as greater than about 0.8, greater than about 0.9, greater than about 0.95, or the like), the label prediction corresponding to the reference image ($y^{(r)}$) will be assigned to the input image, irrespective of label predicted by the neural network ($nn_\beta$) ($x^p$)). However, if the correlation between the input image and a reference image is determined to be low (i.e., $cor(d^{r,p}) \to 0$ and/or $cor(d^{r,p})$ is less than a threshold such as less than about 0.1, less than about 0.2, less than about 0.05, or the like), the label predicted by the neural network ($nn_\beta$)($x^p$)) will be used as the image label prediction. In other words, if an input image is not identical but very similar to a reference image, it will lead to a small distance between the input image and the reference image creating a high correlation, outweighing the neural network prediction. However, if an input image is not similar to any reference image, the reference dataset will not have any effect on the neural network label prediction.

For a reference dataset that includes multiple reference images, the correlation of the input image computed from the correlation structure (discussed above) is used as follows:

$$\widetilde{nn}_\beta(x^p); nn_\beta(x^{(p)}) * (1 - cor_{max}^{(r,p)}) + cor_{max}^{(r,p)} * y^{(rmax)}$$

In various embodiments, the parameter θ may be configured to control the similarity between two images for them to be correlated.

At 214, the system may input the predicted label prediction into any now or hereafter known object detection models to output bounding box predictions in the input image and/or into other image processing applications. For example, the image classification described above may be used by object detection algorithms for detecting objects and generating bounding boxes. Once bounding boxes are detected, a track(s) for the objects detected (e.g., a particular instance of an object such as a vehicle, pedestrian, etc.) within the bounding box(es) are optionally determined in. Techniques for determining object tracks are well known. The object track is then optionally used in to control autonomous operations of a mobile platform (e.g., an autonomous vehicle). For example, the predicted cuboids are used to determine a track for the respective object. The object track can then be used to facilitate generation of a platform trajectory which the mobile platform is caused to follow. Subsequently, 216 is performed where method 200 ends or other operations are performed.

The above disclosure, thus, describes an image classification approach that improves prediction accuracy without performing computationally expensive neural network retraining or optimization. Such classification allows image-based algorithms to better predict labels without incurring the cost of neural network modification.

The predictions (e.g., label predictions) generated during method 200 can be used by a mobile platform such as that of an autonomous vehicle for object trajectory prediction, general scene understanding, platform trajectory generation, and/or collision avoidance. A block diagram is provided in FIG. 6 that is useful for understanding how platform control is achieved in accordance with the object related information estimated based on the modified image. All or some of the operations performed in FIG. 5 can be performed by the on-board computing device of a mobile platform (e.g., 101 in FIG. 1) and/or a remote computing device (e.g., remote server 106 of FIG. 1).

Figure 5:
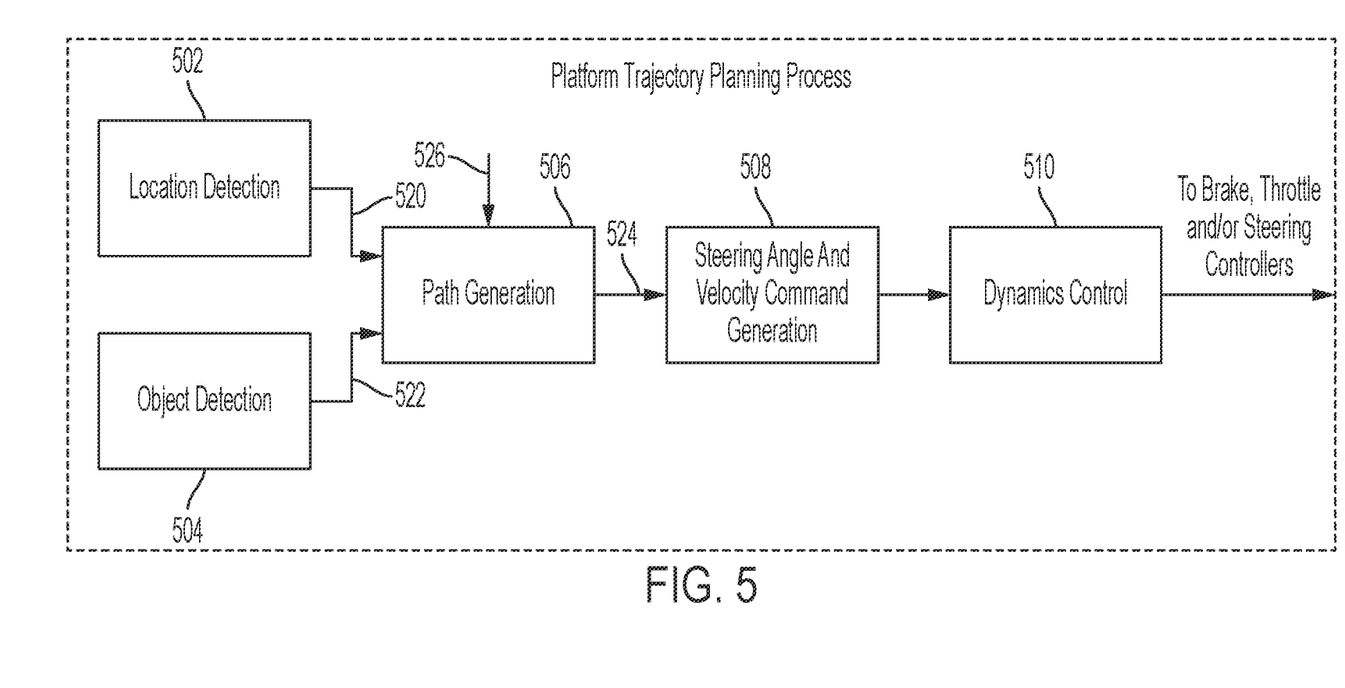
FIG. 5 provides a block diagram that is useful for understanding how a robotic system (e.g., an autonomous vehicle) is controlled in accordance with the present solution.

In block 502, a location of the mobile platform is detected. This detection can be made based on sensor data output from a location sensor (e.g., location sensor 660 of FIG. 6) of the mobile platform. This sensor data can include, but is not limited to, GPS data. Information 520 specifying the detected location of the mobile platform is then passed to block 506.

In block 504, an object is detected within proximity of the mobile platform. This detection is made based on sensor data output from a perception sensor (e.g., camera(s) 662 of FIG. 6) of the mobile platform and/or LiDAR datasets generated by a LiDAR system (e.g., LiDAR system 664 of FIG. 6) of the mobile platform. The manner in which the image-based perception is achieved was discussed above in relation to FIG. 1. Image-based perception information 522 about the detected object is passed to block 506. This information includes, but is not limited to, cuboid information (e.g., a position of an object, an orientation of the object, and a spatial extent of the object), an initial predicted trajectory of the object, a speed of the object, and/or a classification of the object. The initial predicted object trajectory can include, but is not limited to, a linear path pointing in the heading direction of the object.

In block 506, a platform trajectory is generated using the information from blocks 502 and 504. Techniques for determining a platform trajectory are well known in the art. Any known or to be known technique for determining a platform trajectory can be used herein without limitation. For example, in some scenarios, such a technique involves determining a trajectory for the mobile platform that would pass the object when the object is in front of the mobile platform, the object has a heading direction that is aligned with the direction in which the mobile platform is moving, and the object has a length that is greater than a threshold value. The present solution is not limited to the particulars of this scenario. The platform trajectory 524 can be determined based on the information 520, the image-based perception information 522, and/or a road map 526 which is pre-stored in a datastore of the mobile platform. The platform trajectory 524 may represent a smooth path that does not have abrupt changes that would otherwise provide passenger discomfort. For example, the platform trajectory is defined by a path of travel along a given lane of a road in which the object is not predicted travel within a given amount of time. The platform trajectory 524 is then provided to block 508.

In block 508, a steering angle and velocity command is generated based on the platform trajectory 524. The steering angle and velocity command are provided to block 510 for dynamics control.

The mobile platform also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

Notably, this document describes the present solution in the context of an autonomous vehicle. However, the present solution is not limited to autonomous vehicle applications. The present solution may be used in other applications such as robotic applications, radar system applications, metric applications, and/or system performance applications.

Figure 6:
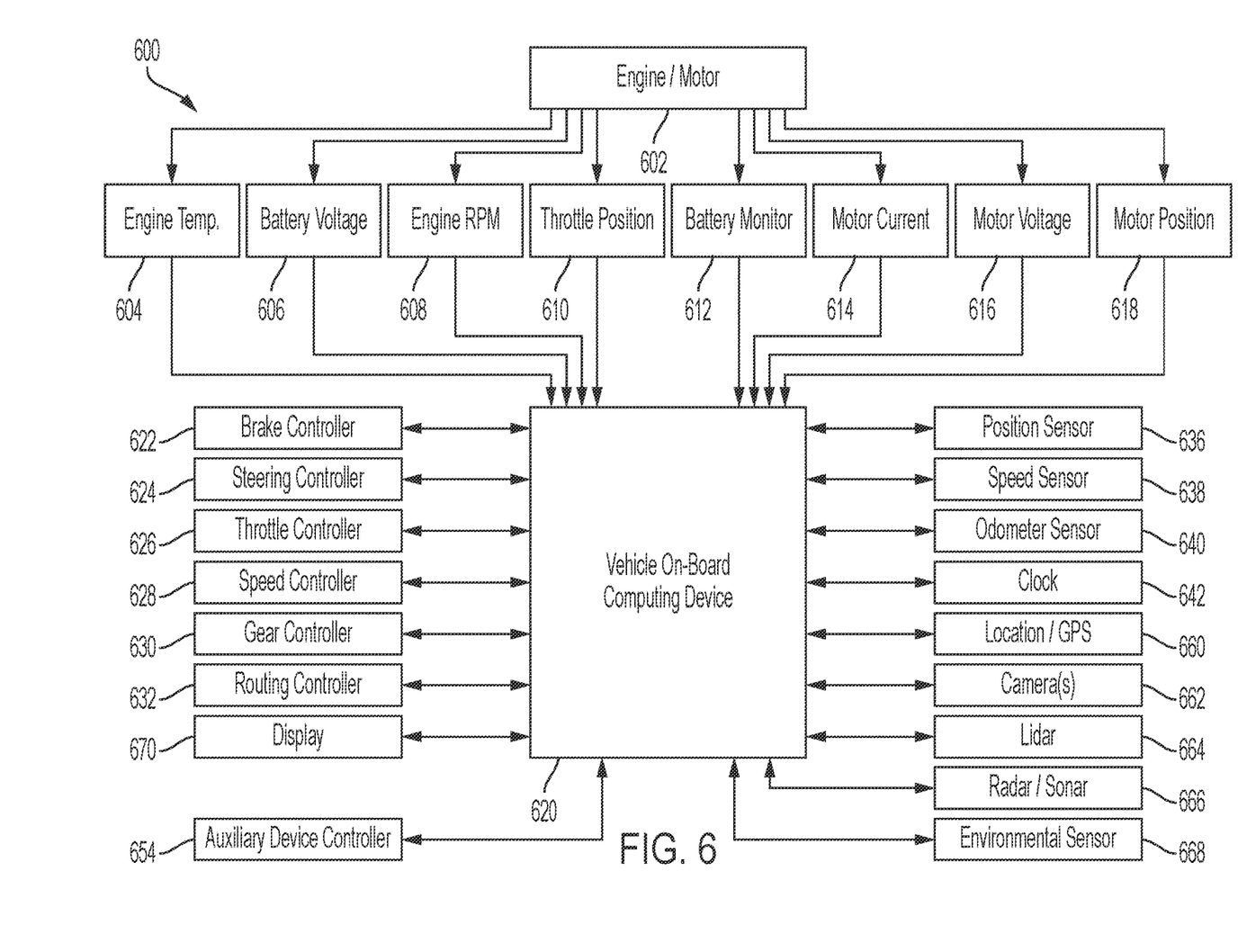
FIG. 6 illustrates example systems and components of an autonomous vehicle.

Referring now to FIG. 6, there is provided an illustration of an illustrative system architecture for a mobile platform 600, such as an autonomous vehicle. Other types of vehicles are considered within the scope of the technology described herein and may contain more or less elements as described in association with FIG. 6. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 6, the system architecture 600 includes an engine or motor 602 and various sensors 604-618 for measuring various parameters of the vehicle. In gas-powered or hybrid vehicles having a fuel-powered engine, the sensors may include, for example, an engine temperature sensor 604, a battery voltage sensor 606, an engine Revolutions Per Minute (RPM) sensor 608, and a throttle position sensor 610. If the vehicle is an electric or hybrid vehicle, then the vehicle may have an electric motor, and accordingly will have sensors such as a battery monitoring system 612 (to measure current, voltage and/or temperature of the battery), motor current 614 and voltage 616 sensors, and motor position sensors 618 such as resolvers and encoders 618.

Operational parameter sensors that are common to both types of vehicles include, for example: a position sensor 636 such as an accelerometer, gyroscope and/or inertial measurement unit; a speed sensor 638; and an odometer sensor 640. The vehicle also may have a clock 642 that the system uses to determine vehicle time during operation. The clock 642 may be encoded into the vehicle on-board computing device 620, it may be a separate device, or multiple clocks may be available.

The vehicle also will include various sensors that operate to gather information about the environment in which the vehicle is traveling. These sensors may include, for example: a location sensor 660 (for example, a GPS device); object detection sensors such as one or more cameras 662; a lidar sensor system 664; and/or a RADAR and/or SONAR system 666. The sensors also may include environmental sensors 668 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 620. The vehicle on-board computing device 620 may be implemented using the computer system of FIG. 7. The vehicle on-board computing device 620 analyzes the data captured by the sensors and optionally controls operations of the vehicle based on results of the analysis. For example, the vehicle on-board computing device 620 may control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers. Auxiliary device controller 654 may be configured to control one or more auxiliary devices, such as testing systems, auxiliary sensors, mobile devices transported by the vehicle, etc.

Geographic location information may be communicated from the location sensor 660 to the vehicle on-board computing device 620, which may then access a map of the environment that corresponds to the location information to determine known fixed features of the environment such as streets, buildings, stop signs and/or stop/go signals. Captured images from the cameras 662 and/or object detection information captured from sensors such as lidar system 664 is communicated from those sensors to the vehicle on-board computing device 620. The object detection information and/or captured images are processed by the vehicle on-board computing device 620 to detect objects in proximity to the vehicle. Any known or to be known technique for making an object detection based on sensor data and/or captured images can be used in the embodiments disclosed in this document.

Lidar information is communicated from lidar system 664 to the vehicle on-board computing device 620. Additionally, captured images are communicated from the camera(s) 662 to the vehicle on-board computing device 620. The lidar information and/or captured images are processed by the vehicle on-board computing device 620 to detect objects in proximity to the vehicle. The manner in which the object detections are made by the vehicle on-board computing device 620 includes such capabilities detailed in this disclosure.

In addition, the system architecture 600 may include an onboard display device 670 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 620 may include and/or may be in communication with a routing controller 632 that generates a navigation route from a start position to a destination position for an autonomous vehicle. The routing controller 632 may access a map data store to identify possible routes and road segments that a vehicle can travel on to get from the start position to the destination position. The routing controller 632 may score the possible routes and identify a preferred route to reach the destination. For example, the routing controller 632 may generate a navigation route that minimizes Euclidean distance traveled or other cost function during the route, and may further access the traffic information and/or estimates that can affect an amount of time it will take to travel on a particular route. Depending on implementation, the routing controller 632 may generate one or more routes using various routing methods, such as Dijkstra's algorithm, Bellman-Ford algorithm, or other algorithms. The routing controller 632 may also use the traffic information to generate a navigation route that reflects expected conditions of the route (for example, current day of the week or current time of day, etc.), such that a route generated for travel during rush-hour may differ from a route generated for travel late at night. The routing controller 632 may also generate more than one navigation route to a destination and send more than one of these navigation routes to a user for selection by the user from among various possible routes.

In some scenarios, the vehicle on-board computing device 620 may determine perception information of the surrounding environment of the vehicle. Based on the sensor data provided by one or more sensors and location information that is obtained, the vehicle on-board computing device 620 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 620 may process sensor data (for example, lidar data, RADAR data, camera images, etc.) in order to identify objects and/or features in the environment of vehicle. The objects may include, but is not limited to, traffic signals, roadway boundaries, other vehicles, pedestrians, and/or obstacles. The vehicle on-board computing device 620 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 620 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle. pedestrian, bicycle, static object, or obstacle); and/or other state information.

The vehicle on-board computing device 620 may perform one or more prediction and/or forecasting operations. For example, the vehicle on-board computing device 620 may predict future locations, trajectories, and/or actions of one or more objects. For example, the vehicle on-board computing device 620 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 620 may predict whether the object will likely move straight forward or make a turn. If the perception data indicates that the intersection has no traffic light, the vehicle on-board computing device 620 may also predict whether the vehicle may have to fully stop prior to entering the intersection.

In those or other scenarios, the vehicle on-board computing device 620 may determine a motion plan for the vehicle. For example, the vehicle on-board computing device 620 may determine a motion plan for the vehicle based on the perception data and/or the prediction data. Specifically, given predictions about the future locations of proximate objects and other perception data, the vehicle on-board computing device 620 can determine a motion plan for the vehicle that best navigates the vehicle relative to the objects at their future locations.

In those or other scenarios, the vehicle on-board computing device 620 may receive predictions and make a decision regarding how to handle objects and/or actors in the environment of the vehicle. For example, for a particular actor (for example, a vehicle with a given speed, direction, turning angle, etc.), the vehicle on-board computing device 620 decides whether to overtake, yield, stop, and/or pass based on, for example, traffic conditions, map data, state of the autonomous vehicle, etc. Furthermore, the vehicle on-board computing device 620 also plans a path for the vehicle to travel on a given route, as well as driving parameters (for example, distance, speed, and/or turning angle). That is, for a given object, the vehicle on-board computing device 620 decides what to do with the object and determines how to do it. For example, for a given object, the vehicle on-board computing device 620 may decide to pass the object and may determine whether to pass on the left side or right side of the object (including motion parameters such as speed). The vehicle on-board computing device 620 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a time period (for example, N milliseconds). If the collision can be avoided, then the vehicle on-board computing device 620 may execute one or more control instructions to perform a cautious maneuver (for example, mildly slow down, accelerate, change lane, or swerve). In contrast, if the collision cannot be avoided, then the vehicle on-board computing device 620 may execute one or more control instructions for execution of an emergency maneuver (for example, brake and/or change direction of travel).

As discussed above, planning and control data regarding the movement of the vehicle is generated for execution. The vehicle on-board computing device 620 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network.

Figure 7:
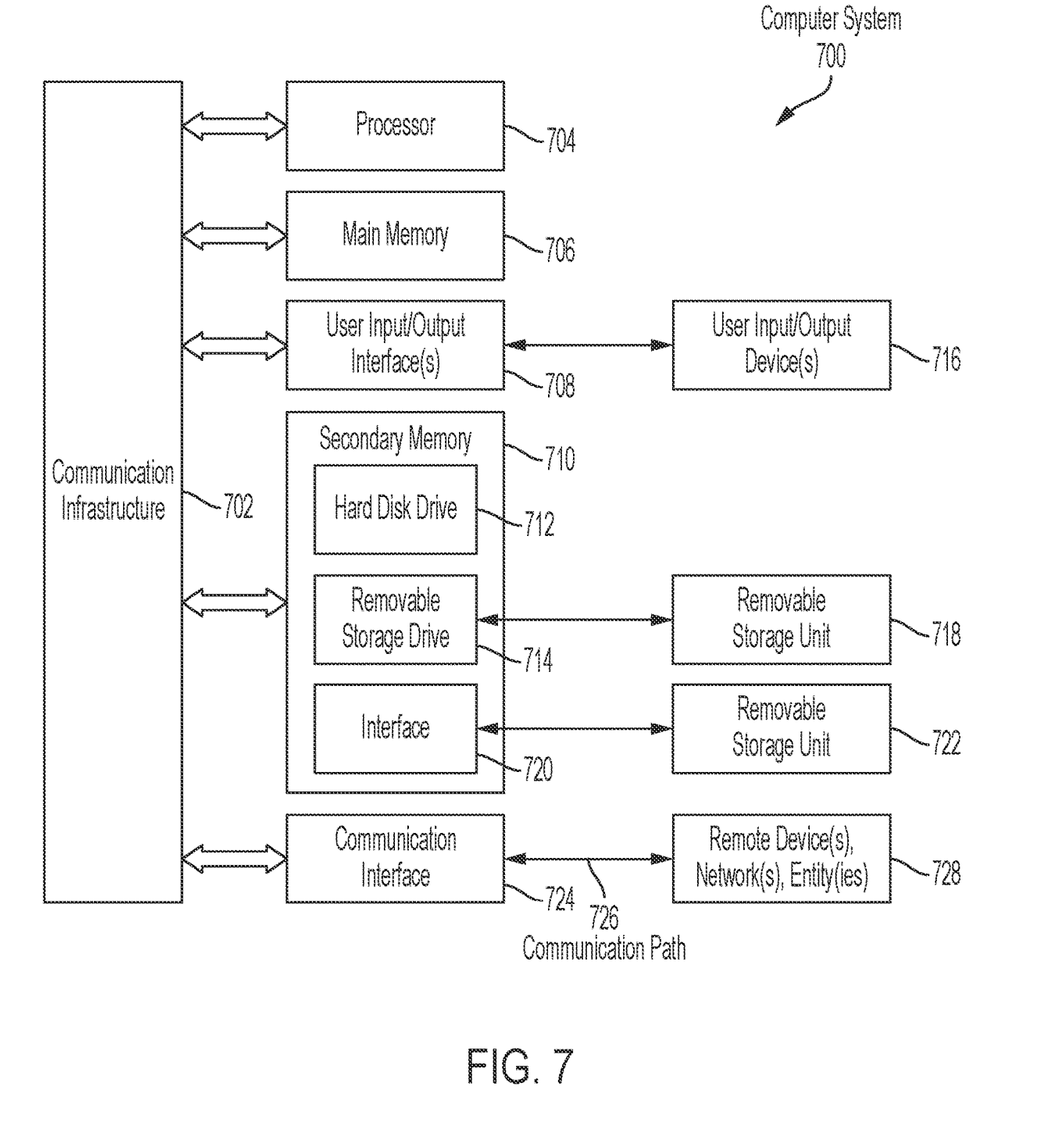
FIG. 7 is a block diagram that illustrates various elements of a possible electronic subsystem of an autonomous vehicle and/or external electronic device.

The present solution can be implemented, for example, using one or more computer systems, such as computer system 700 shown in FIG. 7. Computer system 700 can be any computer capable of performing the functions described herein. The on-board computing device 101 of FIG. 1 and/or the vehicle on-board computing device 620 of FIG. 6 may be the same as or similar to computing system 700. As such, the discussion of computing system 700 is sufficient for understanding the devices 101 and 620 of FIGS. 1 and 6.

Computing system 700 may include more or less components than those shown in FIG. 7. However, the components shown are sufficient to disclose an illustrative solution implementing the present solution. The hardware architecture of FIG. 7 represents one implementation of a representative computing system configured to operate a vehicle, as described herein. As such, the computing system 700 of FIG. 7 implements at least a portion of the method(s) described herein.

Some or all components of the computing system 700 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 700 includes one or more processors (also called central processing units, or CPUs), such as a processor 704. Processor 704 is connected to a communication infrastructure or bus 702. One or more processors 704 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 716, such as monitors, keyboards, pointing devices, etc., that communicate with communication infrastructure 702 through user input/output interface(s) 708. Computer system 700 further includes a main or primary memory 706, such as random access memory (RAM). Main memory 706 may include one or more levels of cache. Main memory 706 has stored therein control logic (i.e., computer software) and/or data.

One or more secondary storage devices or memories 710 may be provided with computer system 700. Secondary memory 710 may include, for example, a hard disk drive 712 and/or a removable storage device or drive 714. Removable storage drive 714 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 714 reads from and/or writes to removable storage unit 714 in a well-known manner.

In some scenarios, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In some scenarios, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 706, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 7. In particular, the present solution can operate with software, hardware, and/or operating system implementations other than those described herein.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology. A neural network or a artificial neural network is one set of algorithms used in machine learning for modeling the data using graphs of neurons.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service.

The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

The term "bounding box" refers to a rectangular box that represents the location of an object. A bounding box may be represented in data by x- and y-axis coordinates [$x_{max}$, $y_{max}$] that correspond to a first corner of the box (such as the upper right corner), along with x- and y-axis coordinates [$x_{min}$, $y_{min}$] that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a LiDAR sensor.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

The invention claimed is:

1. A method comprising, by a processor:
   receiving an input image;
   generating, using a trained neural network, a label prediction corresponding to the input image;
   generating, based on a comparison of the input image with each of a plurality of reference images, a correlation structure;
   generating, using the label prediction and the correlation structure, an updated label prediction corresponding to the input image;
   using the updated label prediction for controlling a navigation route of an autonomous vehicle; and
   performing an autonomous driving action to the autonomous vehicle using the navigation route, wherein the autonomous driving action includes at least one of acceleration, braking, and steering.

2. The method of claim 1, wherein generating the correlation structure comprises computing a distance between the input image and each of the plurality of reference images, the distance being associated with one or more color channels.

3. The method of claim 1, wherein generating the updated label prediction corresponding to the input image comprises identifying the label prediction as the updated label prediction in response to determining that there exists a correlation between the input image and each of the plurality of reference images that is less than a threshold.

4. The method of claim 1, wherein generating the updated label prediction corresponding to the input image comprises identifying a correct label associated with a reference image as the updated label prediction in response to determining that there exists a high correlation between the input image and the reference image that outweighs the label prediction.

5. The method of claim 1, further comprising generating a reference dataset comprising the plurality of reference images, wherein at least one of the plurality of reference images comprises an adversarial image or an image associated with an edge case.

6. The method of claim 5, further comprising generating the reference dataset to include a correct label prediction associated with each of the plurality of reference images.

7. The method of claim 1, wherein generating the correlation structure comprises computing a distance between the input image and each of the plurality of reference images by comparing a feature map of the input image and a reference feature map of that reference image, the feature map and the reference feature map obtained from a layer of the trained neural network.

8. The method of claim 1, wherein generating the correlation structure comprises:
   identifying a reference image of the plurality of reference images that has a highest correlation with the input image; and
   identifying a correct label associated with the identified reference image as the updated label prediction.

9. The method of claim 1, wherein the correlation structure is a Gaussian process correlation structure.

10. A system for performing image classification, the system comprising:
a processor; and
a non-transitory computer-readable medium comprising programming instructions that when executed by the processor will cause the processor to:
receive an input image,
generate, using a trained neural network, a label prediction corresponding to the input image,
generate, based on a comparison of the input image with each of a plurality of reference images, a correlation structure,
generate, using the label prediction and the correlation structure, an updated label prediction corresponding to the input image, and
use the updated label prediction for controlling navigation of an autonomous vehicle including at least one of: acceleration, braking, and steering.

11. The system of claim 10, wherein the programming instructions that when executed by the processor will cause the processor to generate the correlation structure comprise programming instructions to cause the processor to compute a distance between the input image and each of the plurality of reference images, the distance being associated with one or more color channels.

12. The system of claim 10, wherein the programming instructions that when executed by the processor will cause the processor to generate the updated label prediction corresponding to the input image comprise programming instructions to cause the processor to identify the label prediction as the updated label prediction in response to determining that there exists a correlation between the input image and each of the plurality of reference images that is less than a threshold.

13. The system of claim 10, wherein the programming instructions that when executed by the processor will cause the processor to generate the updated label prediction corresponding to the input image comprise programming instructions to cause the processor to identify a correct label associated with a reference image as the updated label prediction in response to determining that there exists a high correlation between the input image and the reference image that outweighs the label prediction.

14. The system of claim 10, further comprising programming instructions that when executed by the processor will cause the processor to generate a reference dataset comprising the plurality of reference images, wherein at least one of the plurality of reference images comprises an adversarial image or an image associated with an edge case.

15. The system of claim 14, further comprising programming instructions that when executed by the processor will cause the processor to generate the reference dataset to include a correct label prediction associated with each of the plurality of reference images.

16. The system of claim 10, wherein the programming instructions that when executed by the processor will cause the processor to generate the correlation structure comprise programming instructions to cause the processor to compute a distance between the input image and each of the plurality of reference images by comparing a feature map of the input image and a reference feature map of that reference image, the feature map and the reference feature map obtained from a layer of the trained neural network.

17. The system of claim 10, wherein the programming instructions that when executed by the processor will cause the processor to generate the correlation structure comprise programming instructions to cause the processor to:
identify a reference image of the plurality of reference images that has a highest correlation with the input image; and
identify a correct label associated with the identified reference image as the updated label prediction.

18. A method for an autonomous vehicle, comprising:
receiving an input image;
generating, using a trained neural network, a label prediction corresponding to the input image;
generating, based on a comparison of the input image with each of a plurality of reference images, a correlation structure;
generating, using the label prediction and the correlation structure, an updated label prediction corresponding to the input image; and
controlling navigation of an autonomous vehicle using the updated label prediction, wherein the controlling navigation includes at least one of: acceleration, braking, and steering.

19. An autonomous vehicle comprising:
a vehicle system for controlling at least one of acceleration, braking and steering; and
a system for performing image classification according to claim 10.

* * * * *